May 14, 1968 W. A. BLAKE 3,382,602
FISHHOOK
Filed Oct. 21, 1965 2 Sheets-Sheet 1
FIG. 1
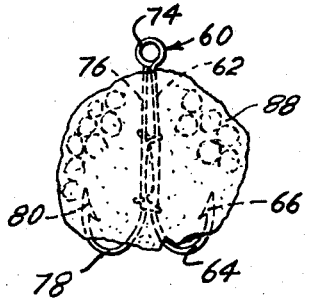
FIG. 2
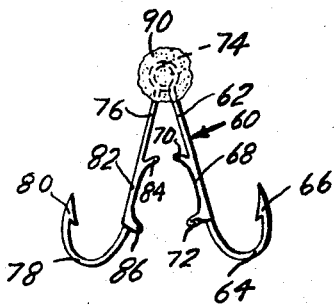
FIG. 3
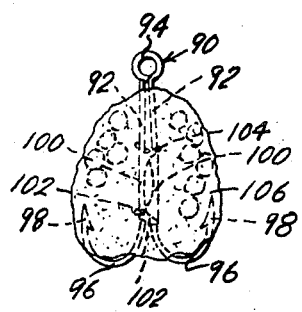
FIG. 4
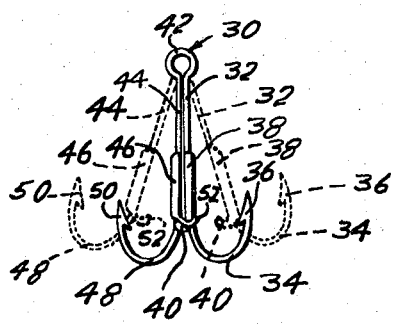
FIG. 5
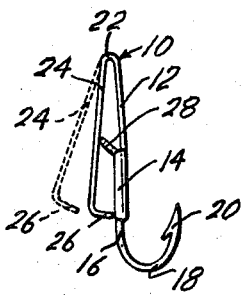
FIG. 6
FIG. 7
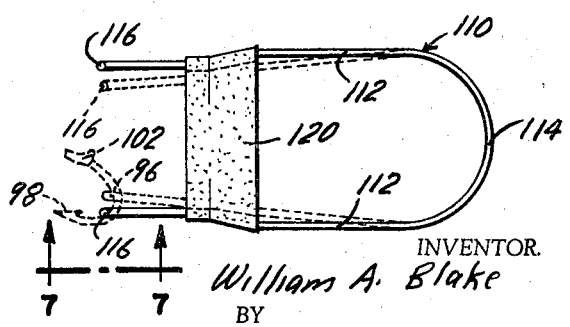
INVENTOR.
William A. Blake
BY
JW Secrest
ATTORNEY May 14, 1968 W. A. BLAKE 3,382,602
FISHHOOK
Filed Oct. 21, 1965 2 Sheets-Sheet 2

INVENTOR.
William A. Blake
BY TW Secrest

ATTORNEY

United States Patent Office 3,382,602
Patented May 14, 1968

3,382,602
FISHHOOK
William A. Blake, Glenoma, Wash. 98336
Continuation-in-part of application Ser. No. 357,976,
Apr. 7, 1964. This application Oct. 21, 1965, Ser.
No. 505,595
8 Claims. (Cl. 43—44.6)

ABSTRACT OF THE DISCLOSURE

A fabricated fishhook for holding a cluster of eggs, including two shanks integrally joined together, at least one of the shanks being formed of two shank portions united so as to be integral. An impaling member projects from one of the shanks toward the other shank and a catch may be provided on one of the shanks for engaging the other shank.

---

This application is a continuation-in-part of application Ser. No. 357,976, filing date of Apr. 7, 1964, now abandoned.

This invention is for a fishhook capable of holding a cluster of eggs.

As is well known, fishermen use a variety of objects for bait. One of the oldest used, and most extensively used, objects is a worm such as an angle worm or a night crawler. Another form of bait is a fish egg such as a salmon egg or a number of salmon eggs placed on a hook. Some fishermen use live fish such as minnows or pieces of fish which have been cut to an appropriate size for placing on a fishhook. Still other fishermen may use artificial flies. Another form of bait is a cluster of fish eggs. The fish eggs may be treated so as to form a jellied mass which can be dipped out of a container, either by hand or by an implement, and then placed on the hook. Prior to my invention, it has been difficult to place a cluster of fish eggs on a hook as a cluster has a somewhat loose consistency such as a heavy jelly or a fruit preserve. The cluster has a high viscosity and will hold together but will also move. The placing of a cluster on a fishhook has been difficult as the cluster tends to move on the shank of the hook, and in some instances, falls off the hook. Therefore, I have invented this fishhook which is capable of holding a cluster of eggs.

Accordingly, an object of this invention is the provision of a fishhook which positively holds a cluster of eggs; a fishhook which so holds the eggs that the hook is hidden or obscured from view by fish; and, an adapter for spreading apart the shanks of the fishhooks so that the fishhook can receive the cluster of eggs.

These and other important objects and advantages of the invention will be more particularly brought forth upon reference to the accompanying drawings, the detailed specification of the invention and the appended claims.

In the drawings:

FIGURE 1 is a view of an actual embodiment of a fishhook constructed in accordance with the preferred teachings of this invention, and illustrates a cluster of eggs surrounding the fishhook;

FIGURE 2 is a view of a fishhook with the two shanks spread apart and the fish eggs around the eye of the fishhook;

FIGURE 3 is a view of a fishhook with the two shanks close together and a cluster of eggs surrounding the shanks and the hooks;

FIGURE 4 is a view of another embodiment of the fishhook;

FIGURE 5 is a view of a still further embodiment of the fishhook;

FIGURE 6 is a view of a fishhook gripper and which gripper is employed for spreading apart the two hooks of the fishhook;

Figure 8:
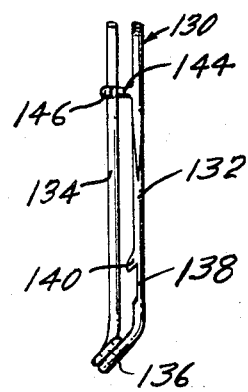
Figure 9:
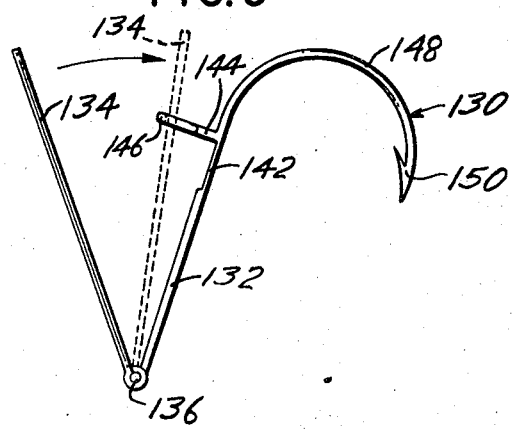
Figure 10:
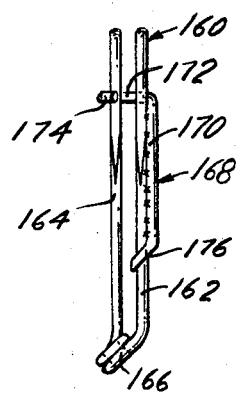
Figure 11:
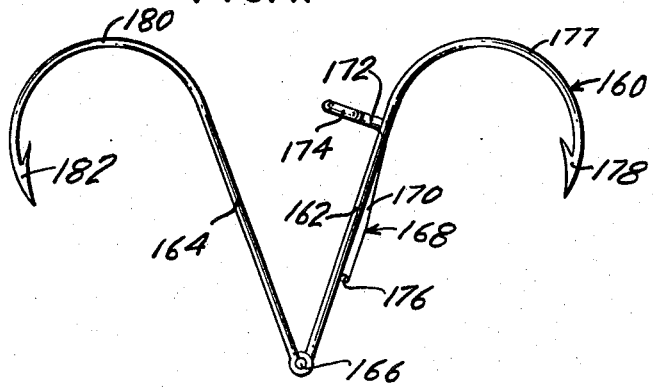
Figure 12:
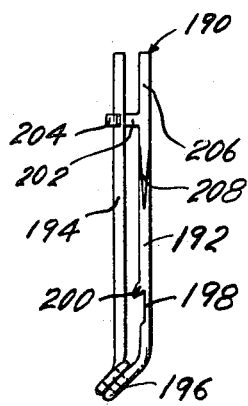

FIGURE 7, taken on line 7—7 of FIGURE 6, is an enlarged view showing a finger of the fishhook gripper, and with the finger contacting a hook portion of a fishhook;

FIGURE 8 is a front elevational view of another preferred embodiment of a fishhook of a unitary construction, and shows a catch on a first shank positioning the second shank;

FIGURE 9 is a side elevational view of said fishhook of FIGURE 8, and shows the second shank disengaged from the catch on the first shank;

FIGURE 10 is a front elevational view of still another preferred embodiment of the invention and illustrates a fishhook having an integral catch and impaling member with the catch positioning the second shank;

FIGURE 11 is a side elevational view of the fishhook of FIGURE 10 and shows the second shank disengaged from the catch on the first shank; and FIGURE 12 is a front elevational view of another embodiment of the invention, and illustrates a fishhook made from flat stock.

In FIGURE 5 there is illustrated a fishhook 10 having a first shank portion 12. This first shank portion 12 is attached by means of solder 14 to another shank-portion 16. The shank portions 12 and 16 may be considered to be one continuous shank portion or a first shank portion. The first shank portion 16 bends into a fishhook 18 having an upwardly directed barb or burr 20. The upper part of the first shank portion 12 bends at 22 and, then, bends downwardly into the second shank portion 24. The lower end of the second shank portion 24 is directed toward the first shank portion 12 or 16 as impaling member 26. It is seen that the second shank portion 24 is substantially parallel and juxtapositioned with respect to the first shank portion 12 or 16. The first shank portion has an impaling member 28 directed toward the second shank portion 24.

In the construction of the fishhook 10, it may be considered that the lower end of the shank 12 is soldered to the upper end of the shank 16 to make one continuous shank. Also, the upper end of the shank 16 may be directed inwardly at 28 to make the impaling member 28.

The shanks 12 and 24 may be of spring steel.

In FIGURE 4 there is illustrated a fishhook 30 having a first shank 32. The first shank 32 bends at 34 into barb 36. Actually, the lower end of the first shank 32 is soldered at 38 to the upper end of the bend 34. Also, the lower end of the shank 32 bends inwardly at 40 into an impaling member. The upper end of the first shank 32 curves as indicated at 42 to form an eye. The eye 42 connects with a straight second shank 44. The second shank 44 connects by means of solder 46 with the upper end of a hook which bends at 48 into a barb or burr 50. Actually, the lower end of the second shank 44 curves inwardly as indicated at 52 to form an impaling member 52.

It is seen that the first shank 32 and the second shank 44 are substantially parallel and are touching for most of their length. Also, the impaling member 52 on the second shank 44 overlies the first shank 32; and, the impaling member 40 on the first shank 32 overlies the second shank 44.

The shanks 32 and 44 may be of spring steel.

In FIGURES 1 and 2 there is illustrated a fishhook 60. This fishhook 60 has a first shank 62 which terminates at its lower end in a bend 64. The bend 64 terminates in an upwardly directed barb or burr 66. Acutally, the shank 62 is composed of two sections as the lower end of shank 62 is soldered at 68 to the upper end of the bend 64 to make a unitary shank. The upper end of the bend 64 is directed inwardly at 70 to form an impaling member. The lower end of the shank 62 is directed inwardly at 72 and back on itself to form a catch 72. The upper end of the shank 62 makes a complete circle or a loop to form an eye 74. Then, the eye 74 depends into a second shank 76. The lower end of the shank 76 connects with the upper end of a bend 78. The bend 78 terminates in an upwardly directed barb or burr 80. Actually, the lower end of shank 76 is soldered at 82 to the upper end of the bend 78. The upper end of the bend 78 terminates in an inwardly directed impaling member 84 and the lower end of shank 76 terminates in an inwardly directed impaling member 86.

In FIGURE 1 it is seen that the first shank 62 and the second shank 76 are substantially parallel to each other and are juxtapositioned with respect to each other. Actually, the lower end of the second shank 76 is caught in the catch 72 on the lower end of the first shank 62.

From FIGURES 1 and 2 it is seen that the two shanks 62 and 76 of the fishhook 60 may be spread apart and a cluster of eggs 88 inserted between the two shanks 62 and 76. Then, the two shanks may be forced close together so that the second shank 76 is caught in the catch 72. Because of the impaling members 70, 84 and 86; the catch 72; and, also, the barbs 66 and 68; the cluster of eggs is firmly positioned on the fishhook 60.

In FIGURE 2 it is seen that the eye 74 of the fishhook may be covered with a cluster of eggs 90. Actually, from FIGURES 1 and 2 it is seen that substantially the entire fishhook may be covered so as to hide the same and all that is visible to the fish is a cluster of eggs 88 and a cluster of eggs 90.

The shanks 62 and 76 may be of spring steel.

In FIGURE 3 there is illustrated a fishhook 90 having two substantially identical shanks and hook portions. Therefore, one set of reference numerals will be employed for identical components. There are two shanks 92 which, at their upper portions, form a loop or an eye 94. The lower ends of the two shanks 92 bend at 96 and are directed upwardly into a barb or a burr 98. Actually, the lower end of the shank 92 is soldered at 100 to the upper end of the bend 96. The lower end of the shank 92 is directed inwardly toward the other shank at 102 to form an impaling member 102. And, the upper end of the bend 96 is directed inwardly toward the other shank 92 to form an impaling member 104. The impaling members 102 and 104 and the hook portions 98 help to maintain a cluster of eggs 106 on the fishhook 90. In FIGURE 3 it is seen that the fishhook 90 is substantially covered by the cluster of eggs 106.

In FIGURES 6 and 7 there is illustrated a gripping means for spreading apart the shanks of the fishhooks. More particularly, this gripping means 110 comprises two legs 112 which unite at a bend 114. Each of the legs 112 terminates in a finger 116. The two fingers 116 are aligned and point in the same direction. The fingers 116, on their outer edges, have a notch or a recess 118. This recess 118 receives a bend 96 of a fishhook such as 90. It is seen that each finger 116 may be positioned inside of a bend of the fishhook and the two shanks of the fishhook spread apart so that the fishhook readily receives a cluster of eggs. Then, the legs 112 and the gripper 110 may be drawn together so that the shanks come together for holding the cluster of eggs.

To limit the outward movement of the legs 112, a keeper 120 may wrap around the legs 112. This keeper 120 may be of cloth or of tape or of other suitable material.

In FIGURES 8 and 9 there is illustrated another preferred embodiment of the invention, fishhook 130. This fishhook comprises the first shank 132, a second shank 134, and which shanks unite in the eye 136. It is seen, see FIGURE 8, that the two shanks 132 and 134 substantially overlie each other and are substantially parallel. The eye 136 is at an angle of approximately 45 degrees with the longitudinal axis of the shank 134 or the shank 132.

In FIGURE 8 is it seen that the shank 132 has been cut away to form a thin portion, or a portion of reduced diameter 138. That part of the shank 132 which has been removed has been formed into an impaling member 140 which is directed toward the second shank 134. In FIGURE 9 is is seen that the shank 132 has been cut away to form a portion 142 of a reduced diameter. The part of the shank 132 which has been removed has been formed into a catch having a base 144 and a curved wrap-around portion 146, to form the catch. In FIGURE 8 it is seen that the catch is positioning the second shank 134. The first shank 132 bends at 148 and terminates in a barb or burr 150.

In use, the cluster of eggs may be positioned between the first shank 132 and the second shank 134, and the second shank placed inside of the catch 146. Then, the fisherman may snell the cluster of eggs by wrapping the leader around the eggs. The base 144 and the impaling member 140 assist in positioning the cluster of eggs on the fishhook 130.

In FIGURE 10 there is illustrated a fishhook 160 having a first shank 162 and a second shank 164. The shanks 162 and 164, in FIGURE 10, substantially overlie each other and are substantially parallel. These two shanks unite in an eye 166. The eye 166 is offset at an angle of approximately 45 degrees with respect to the longitudinal axis of the first shank 162 and with respect to the longitudinal axis of the second shank 164.

There is positioned on the first shank 162 an integral catch and impaling member 168. The impaling member 168 comprises a shaft 170 which, at one end, bends into a base 172 and which bends back on itself to form a catch 174. The other end of the shaft 170 bends to form an impaling member 176. The integral catch and impaling member 168 may be bonded to the first shank 162 by spot welding, brazing or soldering. In FIGURE 10 it is seen that the base 172 and the impaling member 176 are on opposite sides of the shank 162, but are generally directed toward the second shank 164. To a degree, the integral catch and the impaling member 168 wrap around the first shank 162.

The first shank 162 curves at 177 and terminates in a barb or burr 178. The second shank 164 curves at 180 and terminates in a barb or burr 182.

Again, a cluster of eggs may be positioned between the two shanks 162 and 164. The base 172 and the catch 174, in conjunction with the two shanks 162 and 164 and the impaling member 176, assist in positioning the cluster of eggs. Further, if a fisherman desires, he may snell the cluster of eggs on the fishhook by the use of the leader for giving additional support to the eggs. For example, with the fishhook 130, as illustrated in FIGURE 9, and the fishhook 160, as illustrated in FIGURE 11, a leader may be passed through the eye of the fishhook and around the cluster of eggs. Then, after enveloping the cluster of eggs, the leader again may pass through the eye of the fishhook. The fishhook may be closed so that the two shanks are close together. In this manner there is a four-way support for the cluster of eggs.

In FIGURES 12 and 13 there is illustrated a fishhook 190 having a first shank 192 and a second shank 194. The two shanks 192 and 194 join or unite at an eye 196. The two shanks 192 and 194, as illustrated in FIGURE 12, overlie each other and are substantially parallel to each other. The eye 196 is at an approximate 45 degree angle with the longitudinal axis of the first shank 192 and the second shank 194. The first shank 192 is cut away to form a reduced section 198. The cut away or folded away portion 200 is formed into an impaling member. Also, the first shank 192 is cut away to form a base 202 which in turn forms a catch 204. The catch 204 positions the second shank 194. The first shank 192 bends at 206 and terminates in a barb or burr 208. The material used in forming the fishhook 190 is flat stock.

It is in a lateral cross-sectional view of a substantially rectangular configuration. The fishhooks 130 and 160 are of a rod-like configuration, i.e., in a lateral cross-sectional view of a circle. Generally speaking, most fishhooks are of a circular configuration in a lateral cross-sectional view. One of the advantages of using a material having, in a lateral cross-sectional view, a rectangular configuration is that it is easier to form the impaling member 200 from the shank 198 and, also, easier to form the base 202 and the catch 204 from the shank 194.

The materials of construction for the fishhook may be numerous such as spring steel and the steel normally used in fishhook construction. The fishhooks 130, 160 and 190 may be made of one type of material such as spring steel or another suitable steel. The fishhooks 60, 30, 90 and 10 may be made of two different types of material. That portion of the shank or shanks which forms an eye or unites to fold back on each other may be of spring steel. The barb or hook portion proper may be of the regular steel used in the formation of fishhooks.

From the foregoing it is seen that I have provided a fishhook which is capable of holding a cluster of eggs, and a means for spreading apart the shanks of the fishhook to receive the cluster of eggs.

What I claim is:

1. A fishhook adapted to hold a cluster of eggs which comprises: a first member formed of spring steel, said member being bent to form a centrally disposed eye portion having first and second shanks extending therefrom; a third shank, said third shank having one end portion joined in an overlying relationship to the outer portion of said first shank to form an enlarged region and having the other end portion thereof bending into a burr; a fourth shank, said fourth shank having one end portion joined in an overlying relationship to the outer portion of said second shank to form an enlarged region and having the other end portion thereof bending into a burr, at least one of said shanks having a free end bent to form an impaling member which projects out of one of said enlarged regions and is directed towards the other of said enlarged regions.

2. The fishhook of claim 1, wherein one of said shanks is provided with a free end bent to form a catch, said catch projecting out of one of said enlarged regions and directed toward the other of said enlarged regions, said catch being adapted to maintain said enlarged regions in an overlying relationship against the bias of said first member.

3. The fishhook of claim 1, wherein said first member is bent to normally bias said enlarged regions into an overlying relationship.

4. A fishhook adapted to hold a cluster of eggs which comprises: a first member formed of spring steel, said member being bent into a generally U-shaped configuration having dependent first and second shanks; a third shank, said third shank having one end portion joined in an overlying relationship to the outer portion of said first shank to form an enlarged region and having the other end portion thereof bending into a burr, said second shank having its free outer end bent to form an impaling member directed toward said enlarged region, and said third shank having a free end bent to form an impaling member which projects out of said enlarged region and is directed toward said second shank.

5. A fishhook adapted to hold a cluster of eggs, said fishhook comprising:
   (a) a first shank;
   (b) a second shank;
   (c) said first and second shanks uniting to be integral;
   (d) said first and second shanks being in an overlying relationship;
   (e) one of said shanks bending into a burr;
   (f) a third shank;
   (g) said third shank connecting with and being integral with one of said first and second shanks; and,
   (h) said third shank having a first free end bent to form an impaling member and a second free end terminating in a catch.

6. A fishhook according to claim 5 and comprising:
   (a) said impaling member of the third shank being directed toward the other one of the first and second shanks; and,
   (b) said catch of the third shank being directed toward the other one of the first and second shanks.

7. A fishhook according to claim 5 and comprising:
   (a) both of said first and second shanks terminate in a burr.

8. A fishhook according to claim 5 and comprising:
   (a) said impaling member of the third shank being directed toward the other one of the first and second shanks;
   (b) said catch of the third shank being directed toward the other one of the first and second shanks;
   (c) both of said first and second shanks terminate in a burr; and,
   (d) said shanks being of flat stock.

References Cited
UNITED STATES PATENTS

| | | | |
|---|---|---|---|
| 2,148,074 | 2/1939 | Kaspick | 43—44.8 |
| 2,583,680 | 1/1952 | Brennan | 43—44.6 X |
| 2,996,828 | 8/1961 | Williams | 43—44.6 X |
| 3,047,977 | 8/1962 | Der-Hagopian | 43—44.8 |

SAMUEL KOREN, Primary Examiner.

D. J. LEACH, Assistant Examiner.